March 6, 1934.  J. C. COREY  1,949,900
SIGN
Filed Nov. 21, 1932
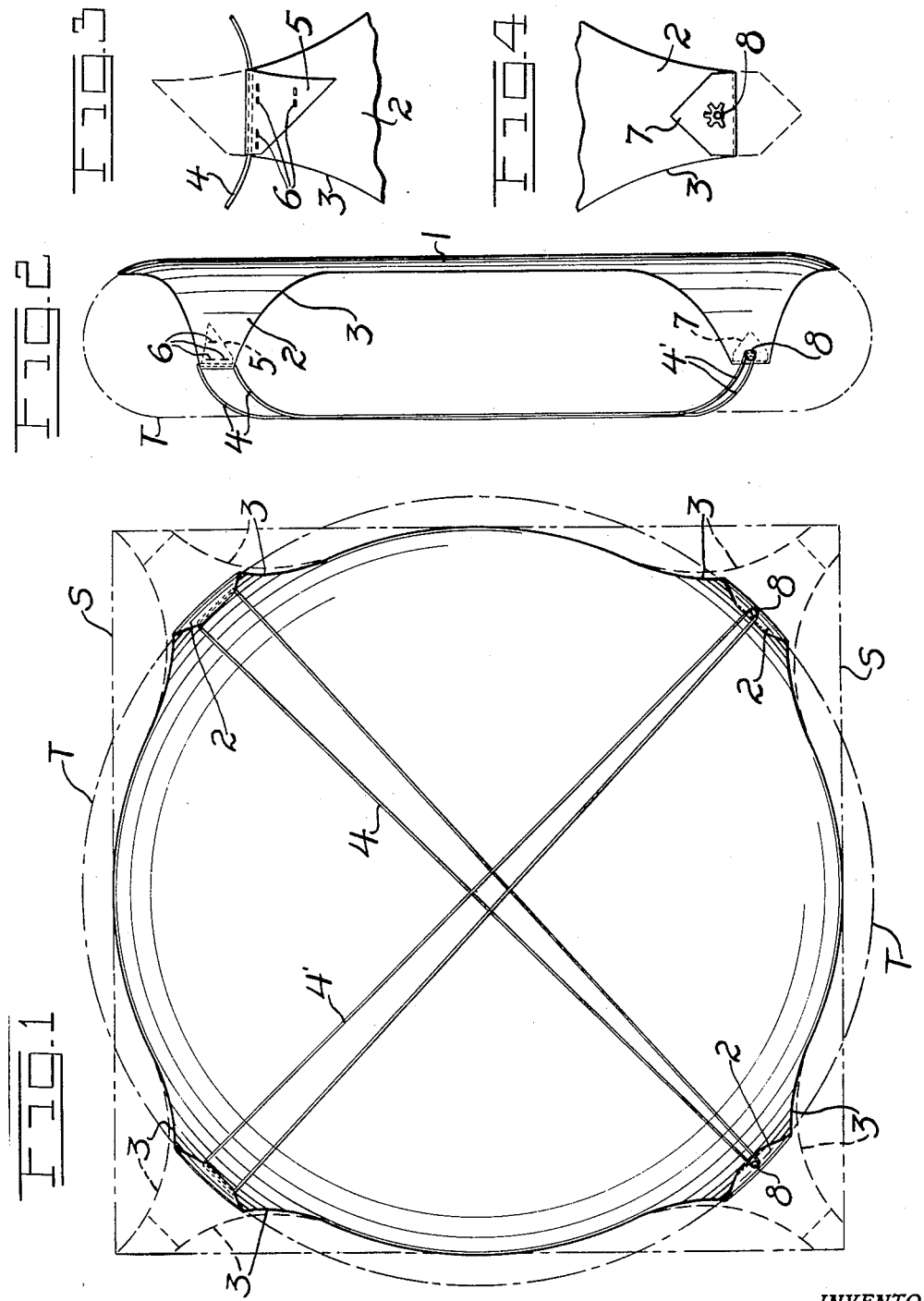
INVENTOR
*Justin C. Corey*
BY
*Charles L. Reynolds*
ATTORNEY Patented Mar. 6, 1934

1,949,900

UNITED STATES PATENT OFFICE 1,949,900

SIGN

Justin C. Corey, Seattle, Wash.

Application November 21, 1932, Serial No. 643,588

10 Claims. (Cl. 40—129)

My invention relates to signs, and particularly to signs of the type which are intended for attachment to the spare tires of automobiles. It is understood, of course, that such signs can be attached to tires whether employed as spare tires of an automobile or upon display stands, and that the principle of my invention is independent of the manner of use, being generally directed to the thought of providing a simple, inexpensive sign for attachment in convenient manner to a tire.

Signs have heretofore been printed or painted upon automobile tire covers, or upon members simulating such covers, but these are expensive, and usually require demounting of the tire from its rack in order to mount the sign. Signs have also been mounted by separate members secured thereto and clamping upon the tire or its rim, but these devices, too, are expensive, and are not convenient to attach. It is the object of my invention, then, to provide an extremely simple and inexpensive sign, one which is neat in appearance, and which is very quickly and easily attached, usually without the necessity of demounting the tire.

More especially it is an object to provide a sign which can be made up of tagboard, heavy paper, or the like, the manufacture and printing of which is simple, and which is therefore economical for such reasons, and for the further reason that it can be cut economically from the available stock.

My invention comprises the novel sign and the novel mounting means therefor, as shown in the accompanying drawing, described in this specification, and as will be more particularly pointed out by the claims which terminate the same.

In the accompanying drawing I have shown my sign embodied in an illustrative form, it being understood that various changes may be made therein, as will be pointed out in this specification, and such as fall within the scope of the appended claims.

Figure 1 is a rear view of the sign, that is, a view from behind the tire (omitted), looking toward the back side of the sign.

Figure 2 is an edge view of the sign in the position it would assume when applied to the tire, and Figures 3 and 4 are elevations of details of the sign.

It has become the custom in political campaigns and in advertising theatrical attractions, and the like, to apply signs to the spare tires of automobiles. Since such events and candidates are advertised for a short time only, it is not necessary that the signs be of lasting character, but they should be so rugged that they will stand up under the conditions met with in such service. Because of the large numbers employed it is essential that they be inexpensive, and because if the driver has difficulty in attaching them he will often throw the sign away rather than take the trouble to attach them, they must be easily attached. My sign is designed to meet all these conditions.

Generally the sign comprises a sheet 1 which is preferably, but not necessarily, of circular outline, and of a size generally corresponding to the periphery of the tire. The tire, whereon the sheet 1 is mounted, is indicated in the dot and dash lines T. The outline of the sheet 1 may be and preferably is somewhat smaller than the periphery of the tire, but should not greatly exceed it. This sheet may be of tagboard, tar paper, and like heavy stock, preferably such as will not disintegrate when exposed to rain, to the sun, and to road conditions.

Interrupting the generally circular contour of the sheet 1 are corner tabs 2. Preferably the outlines of these corner tabs merge by smooth reverse curves, indicated at 3, into the generally circular contour of the sheet 1, for as tension is placed upon these tabs 2, the reverse curved outline thereof distributes the tension along the edge of the sheet 1, and tends to hold its entire edge under tension, so that the edge will not fall away from the front side of the tire to which it is applied. The tabs 2 should be of such length as to extend over the tread of the tire T. They need not extend entirely to the rear side of the tire, and are not so shown in Figure 2. The number of such tabs is not essentially four, as shown, but it will be apparent that three or more such tabs may be employed.

At S in Figure 1 will be observed a square which is tangent to the generally circular outline of the sheet 1, and it is preferable that the corner tabs 2 do not extend outside the outline of this square S, or if they do extend beyond it, by only a small amount. This is in order to economize material, so that the entire sign can be cut from a square of material with very little waste. The sign may be printed after it is blanked out, but it may also be printed by rotary presses before blanking out, because of its nearly square overall outline, being thus conducive of the greatest economy.

Extending from one tab, preferably diametrically opposite to another tab, is a tension member. One tension member might encompass more than two tabs, but I have found it most convenient, where there are four tabs employed, to employ two tension members 4 and 4'. The character and the means of securement of these tension members 4 and 4' may be anything found suitable. Bearing in mind the objectives expressed above, of economy of manufacture, simplicity of construction, and ease of attachment, I prefer that the members 4 and 4' be elastic loops, and to attach these loops I have shown the end of of the tabs 2 folded back, as indicated at 5 (see Figure 3), the elastic loop 4 being received within the fold, and being secured therein by means such as the staples 6. At the diagonally opposite tab the end is preferably folded back to reinforce it, as indicated at 7, and a hook 8 is secured therein. The other elastic loop 4' may be similarly mounted. It will be obvious that cords or like inelastic members might be substituted for the elastic loops 4.

When the sheet is applied to the front side of the tire the tabs 2 pass about or partly about the tread of the tire, and each elastic loop is stretched from its tab 2 to the diagonally opposite tab 2, and is secured to the hook. Thus by means of the two diametrically extending elastic loops the sign is mounted quickly, easily, and securely, and since usually not as much as one-fourth of the tire's circumference is received within a fender well, it will usually be possible to mount the sign without removing the tire from its seat. Of course, where the tire is supported by a center bracket, no difficulty of any sort occurs in mounting the sign.

What I claim as my invention is:

1. A sign for mounting upon a spare tire, comprising a sheet for application to the front side of the tire, having a plurality of corner tabs formed of the same sheet and as integral extensions thereof, said tabs being adapted to extend over the tread of the tire, and means extending from one such tab behind the tire to another tab, and secured to each, thereby to retain the sheet upon the tire.

2. A sign for mounting upon a spare tire, comprising a sheet for application to the front side of the tire having a plurality of corner tabs formed of the same sheet and as integral extensions thereof, said tabs being of a length to extend over the tread of the tire, and a flexible member extending behind the tire from one tab to another tab, thereby to retain the sheet upon the tire.

3. A sign for mounting upon a spare tire, comprising a sheet for application to the front side of the tire having a plurality of corner tabs formed in the same sheet and as integral extensions thereof, said tabs being of a length to extend over the tread of the tire, an elastic member extending behind the tire from one tab to another tab, and means to secure the elastic member to each of said tabs.

4. A sign for mounting upon a spare tire, comprising a sheet for application to and generally conforming to the outline of the tire, a plurality of tabs formed in the same sheet and as integral extensions thereof, said tabs each merging by reverse curves into the marginal outline of the sheet, and of a length to extend over the tread of the tire, and tension means secured to one such tab and extending behind the tire and removably engageable with another such tab, to retain the sheet in place upon the tire.

5. A sign for mounting upon a spare tire, comprising a sheet of generally circular form interrupted by four equally-spaced corner tabs formed in the same sheet and as integral extensions thereof, the sheet being applicable to the front side of a tire, and the tabs being of a length to extend over the tread of the tire, and a tension member extending diametrically across the back side of the tire, and secured to each of two diagonally opposite corner tabs, thus to retain the sheet in place upon the tire.

6. A sign for mounting upon a spare tire, comprising a sheet of generally circular form, and of a size corresponding to the periphery of the tire, four corner tabs formed in the same sheet and as integral extensions thereof, said tabs lying within the outline of a square tangent to the circular outline of the sheet, two tension members, and means at the several corner tabs for attachment of the tension members diagonally from one tab to another.

7. A sign for mounting upon a spare tire, comprising a sheet of generally circular form, and of a size corresponding to the periphery of the tire, four integral corner tabs, the outline of which merges by smooth curves into the generally circular outline of the sheet, and which lie within the outline of a tangent square, two elastic loops, each of two tabs being folded over and secured to retain such loops, and the tabs diagonally opposite the first two being folded over, and hooks mounted upon the reinforced end thus formed.

8. A sign for mounting upon a spare tire, comprising a sheet for application to the front side of the tire, having a plurality of tabs adapted to extend over the tread of the tire, and two or more elastic means each extending directly from one such tab behind the tire to one other tab, and engaged with each, thereby to retain the sheet upon the tire.

9. A sign for mounting upon a spare tire, comprising a sheet for application to the front side of the tire, and two independent crossed means for securing said sheet to the tire, each extending from a connection to the sheet at one side, over the adjacent tread of the tire, substantially diametrically behind the tire, and then over the tread of the tire to a connection with the sheet at a point opposite the first-mentioned connection.

10. A sign for mounting upon a spare tire, comprising a sheet for application to the front side of the tire, and two independent crossed means for securing said sheet to the tire, each extending from a connection to the sheet at one side, over the adjacent tread of the tire, substantially diametrically behind the tire, and then over the tread of the tire to a connection with the sheet at a point opposite the first-mentioned connection, each of said crossed means including an elastic element.

JUSTIN C. COREY.